United States Patent
Brunet et al.

(10) Patent No.: US 10,688,821 B2
(45) Date of Patent: Jun. 23, 2020

(54) INSERT FOR PASSPORT BOOKLET DATA SHEET

(71) Applicant: SMART PACKAGING SOLUTION (S.P.S.), Rousset (FR)

(72) Inventors: Olivier Brunet, Rousset (FR); Anne Ripert, Rousset (FR); Pascal-Daniel Michau, Douai (FR)

(73) Assignee: SMART PACKAGING SOLUTION (S.P.S.), Rousset (FR)

( * ) Notice: Subject to any disclaimer, the term of this patent is extended or adjusted under 35 U.S.C. 154(b) by 0 days.

(21) Appl. No.: 15/745,658

(22) PCT Filed: Jul. 16, 2016

(86) PCT No.: PCT/FR2016/000118
§ 371 (c)(1),
(2) Date: Apr. 23, 2018

(87) PCT Pub. No.: WO2017/013311
PCT Pub. Date: Jan. 26, 2017

(65) Prior Publication Data
US 2018/0304666 A1  Oct. 25, 2018

(30) Foreign Application Priority Data
Jul. 17, 2015 (FR) ..................... 15 01520

(51) Int. Cl.
*B42D 25/24* (2014.01)
*B42D 13/00* (2006.01)
(Continued)

(52) U.S. Cl.
CPC .............. *B42D 25/24* (2014.10); *B42D 13/00* (2013.01); *B42D 25/305* (2014.10);
(Continued)

(58) Field of Classification Search
CPC ................................. B42D 25/24; B42D 13/00
See application file for complete search history.

(56) References Cited

U.S. PATENT DOCUMENTS

| 2004/0207891 A1* | 10/2004 | Suzuki | B42D 25/00 359/1 |
| 2009/0315316 A1* | 12/2009 | Staub | B42D 25/41 283/72 |
| 2018/0147872 A1* | 5/2018 | Thurailingam | B42D 25/24 |

FOREIGN PATENT DOCUMENTS

| DE | 102009010800 B3 * | 7/2010 | ............ B42D 13/00 |
| EP | 1245407 B2 | 4/2006 | |

(Continued)

OTHER PUBLICATIONS

DE-102009010800-B3 English Translation (Year: 2009).*

*Primary Examiner* — Kyle R Grabowski
(74) *Attorney, Agent, or Firm* — Buchanan Ingersoll & Rooney PC

(57) ABSTRACT

The invention relates to an insert for a passport booklet data sheet, formed by a multilayer complex having at least a first layer and a second layer having a hinge that has a folding zone where the insert is intended to be sewn or stapled into a passport booklet, said second layer having, in combination, at least one layer of plastics material and at least one metal reinforcing layer that together form an extension which extends a certain distance beyond said folding zone of the hinge, so as to reinforce the resistance of said data sheet to being ripped out and torn with respect to the passport booklet, characterized in that said layer of plastics material and said metal reinforcing layer extend over the entire surface area of the insert.

12 Claims, 1 Drawing Sheet

(51) Int. Cl.
- *B42D 25/324* (2014.01)
- *B42D 25/328* (2014.01)
- *B42D 25/333* (2014.01)
- *B42D 25/346* (2014.01)
- *B42D 25/373* (2014.01)
- *G06K 19/02* (2006.01)
- *B42D 25/305* (2014.01)
- *G06K 19/077* (2006.01)

(52) U.S. Cl.
CPC ......... *B42D 25/324* (2014.10); *B42D 25/328* (2014.10); *B42D 25/333* (2014.10); *B42D 25/346* (2014.10); *B42D 25/373* (2014.10); *G06K 19/025* (2013.01); *G06K 19/07749* (2013.01); *G06K 19/07773* (2013.01)

(56) References Cited

FOREIGN PATENT DOCUMENTS

| WO | WO-2013006939 A1 * | 1/2013 | ............. B24D 25/24 |
| WO | 2015/018615 A1 | 2/2015 | |

* cited by examiner

INSERT FOR PASSPORT BOOKLET DATA SHEET

The invention relates to a data page for an electronic passport booklet, whether this be a conventional passport or a passport with contactless radiofrequency reading. It also relates to a data page for a passport, and to a passport in the form of a sewn or stapled booklet incorporating such a data page. The invention will hereinafter be described mainly in relation to a passport, although the invention is able to be used with other security documents that use a data page.

PRIOR ART

"Data page" is the name given in the context of the present application to a relatively rigid insert, generally made of polycarbonate, that forms the page of a passport booklet on which the biometric data of the passport holder are inscribed. It is generally understood that the data inscribed on such a data page should be very difficult to modify or forge without highly specialized equipment.

This data page has the same format as the other pages of the passport booklet, except that it includes a hinge at the zone at which the pages of the passport are folded and assembled so that the data page is able to be assembled with the other pages of the passport, generally by sewing or by stapling the various pages of the booklet in the folding zone. In order to improve the pull-out resistance of the data page, the hinge zone is extended by a material extension that extends beyond the folding zone and is generally made of plastic.

Document EP 1 245 407 B2 (Gemalto) has thus already disclosed a flexible data sheet for a passport that combines a layer made of plastic (polycarbonate) that is able to receive data inscriptions by laser, that exhibits relatively little resistance to a high number of bending operations, with a layer made of HDPE (High-Density Polyethylene) that is much more resistant to bending operations and that extends as far as into the hinge of the data sheet. These layers are laminated together using a laminating layer, and the assembly has quite a large thickness of around 600 micrometers. In spite of this large thickness, this data sheet exhibits quite a low pull-out resistance in relation to a passport booklet, as all of the layers are made of plastic that is quite easy to pull out at the stitches of the booklet, in spite of the extension made of plastic extending beyond the hinge.

Document WO 2015/018615 A1 moreover discloses an insert sheet for a passport booklet, including an extension beyond the hinge zone, but this sheet does not include a metal layer that is capable both of improving the mechanical resistance of the insert and of forming an antenna.

AIMS OF THE INVENTION

One general aim of the invention is therefore to propose a novel design for an insert for a data page of a passport booklet or other security document in booklet form that does not exhibit the abovementioned drawbacks.

One particular aim of the invention is to propose a passport booklet data page, including an insert having a novel hinge structure that is at the same time more economical to produce than known polycarbonate hinges, and above all exhibits better performance in terms of pull-out resistance, while at the same time being compatible with electronic passports incorporating a metal layer forming an antenna.

Another aim of the invention is to propose a data page for a passport booklet offering more possibilities for integrating security markings or designs that are able to provide resistance against passport forgery.

SUMMARY OF THE INVENTION

To this end, the principle of the invention provides for proposing an insert structure for a passport booklet data page, including a hinge reinforced by way of a metal layer, and that makes it possible to manufacture data pages having a smaller thickness than known data pages.

A first type of insert for a passport booklet data page includes a metal antenna obtained in particular by removal of material from a whole metal sheet, and that makes it possible to communicate with a remote reader. The invention provides for extending the metal layer used to form the antenna beyond the folding and sewing zone, so as to act as a hinge for the insert and for the data page that incorporates the insert. This hinge is then particularly resistant to pulling out and to tearing, while at the same time being very economical to produce, and while at the same time enabling the production both of the antenna and of the hinge from a single metal layer.

The invention is also applicable to a second type of insert for a data page, namely non-electronic data pages without an antenna. In this case, the insert is formed by a multilayer structure having at least one layer of polyester, and at least one metal layer, but without an antenna, this metal layer again being extended beyond the folding zone of the hinge, in order to improve the pull-out resistance of the data page.

In order to further increase the flexibility of the hinge of the data page, the invention furthermore provides for the insert of the data page to include, along its hinge zone, perforations, for example in a honeycomb shape, enabling the insert to be locally made more flexible.

One subject of the invention is therefore an insert for a passport booklet data page, formed by a multilayer complex including at least a first layer and a second layer including a hinge having a folding zone where the insert is intended to be sewn or stapled into a passport booklet, said second layer including a combination of at least one layer made of plastic and at least one metal reinforcing layer together forming an extension that extends a certain distance beyond said folding zone of the hinge so as to improve the pull-out and tear resistance of said data page in relation to the passport booklet, characterized in that said layer made of plastic and said metal reinforcing layer extend over the entire surface area of the insert.

The layer made of plastic thus gives the insert a high tear resistance, this being known per se. However, the addition of a metal layer also gives this insert a high pull-out resistance with respect to the insert and the data page that uses the latter, in relation to the sewing of a passport booklet.

This insert is preferably an electronic insert provided with an antenna, and the antenna is obtained directly by removal of material from said metal reinforcing layer. In other words, it is the extension of the metal layer used to manufacture the antenna, which extends beyond the folding zone of the hinge and which is therefore intended to be sewn into the passport booklet with the other pages thereof.

When this insert will be used to manufacture a data page for a passport booklet, the pages will be sewn through both the metal layer and the layer made of plastic, giving the data page a resistance greater by an order of magnitude than the resistance of known data pages.

According to one embodiment of the invention, the distance by which the metal layer of the insert extends beyond the folding zone of the hinge, which corresponds to the width of the metal extension, is between 2 and 15 mm.

The metal layer will preferably have a thickness of between 10 and 30 micrometers, and the layer of plastic will have a thickness of between 20 and 150 micrometers. The total thickness of the insert will hence be between 30 and 180 micrometers. The result of this is that a data page using an insert according to the invention may be thinner and easier to integrate into a passport than those that are known, while at the same time exhibiting far better resistance.

According to one embodiment of the insert, said layer made of plastic is made of polyester and exhibits very high tear resistance, and said metal layer is made of aluminum, exhibits very high pull-out resistance and is nevertheless very flexible, thereby enabling the passport booklet using the insert to remain naturally closed.

In order to join the layers of the insert to one another, the layer of aluminum is bonded to the layer of polyester using an adhesive having a thickness of 2 to 3 micrometers, for example made of polyurethane or made of epoxy.

Beyond the advantages in terms of resistance and of low thickness that have just been mentioned, it is also easy to provide the insert according to the invention with visible security elements. To this end, on said extension of the metal layer beyond the hinge, one or more security elements are produced that are visible directly by light reflection or that are in watermark form and that are able to improve the resistance of the data page against forgery.

It is possible to contemplate a plurality of security elements, such as in particular etchings formed in the metal layer, designs in watermark form, holograms, laser-etched designs, or designs obtained by cutting, by hot stamping, by goffering or by embossing and formed on or in the metal layer, or by any other means for marking the metal layer.

Another subject of the invention is a data page for a passport booklet, including an insert according to the invention, and a passport booklet including such a data page.

Other features and advantages of the invention will become apparent upon studying the detailed description and the appended drawings, in which.

DETAILED DESCRIPTION

Figure 1:
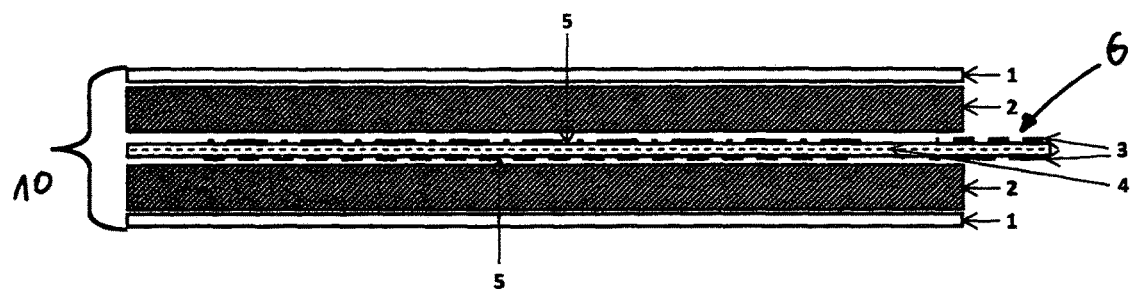
FIG. 1 illustrates a cross-sectional view of the insert according to the invention.

FIG. 1 shows a cross section of an insert 10 for an electronic data page intended to be sewn into a passport booklet or other type of booklet (not shown).

The insert 10 basically includes a core formed by a central layer 4 made of tear-resistant plastic, such as for example PET, and a metal layer 3 bonded to one or both faces of the layer 4 made of plastic (the very thin layer of adhesive is not shown).

Alternatively, it would also be possible to have a single metal layer 3 surrounded on either side by a layer 4 made of plastic.

In one advantageous embodiment, the metal layer 3 has discontinuities, corresponding to removals of material, in particular by chemical or laser etching, so as to form the turns of an antenna 5. However, the antenna 5 may be produced using any other known method, without limiting the scope of the present invention.

One or two opaque layers 2, capable of shielding the turns of the antenna 5, are laminated onto one or preferably onto both sides of the core formed by the layers 3, 4 of PET and of metal. The outer face of these opaque layers may include printed or etched information relating to the passport holder.

Lastly, it is possible to laminate an optional protective layer 1 made of transparent plastic above the opaque layers 2, making it possible through transparency to see the information that may be printed or etched onto the opaque layers 2.

The layers 1, 2 are in the format of pages of a passport booklet. By contrast, it is essential to note that, according to the invention, the layers 3, 4 of plastic and of metal extend a certain distance beyond the layers 1, 2, so as to form an extension 6 of the insert. This extension 6 extends beyond the folding zone 8 of the hinge, where the insert will be sewn or stapled into a passport booklet.

In order to obtain a sufficient pull-out resistance of the insert 10, this distance, which corresponds to the width of the extension 6, is between 2 and 15 mm.

Figure 2:
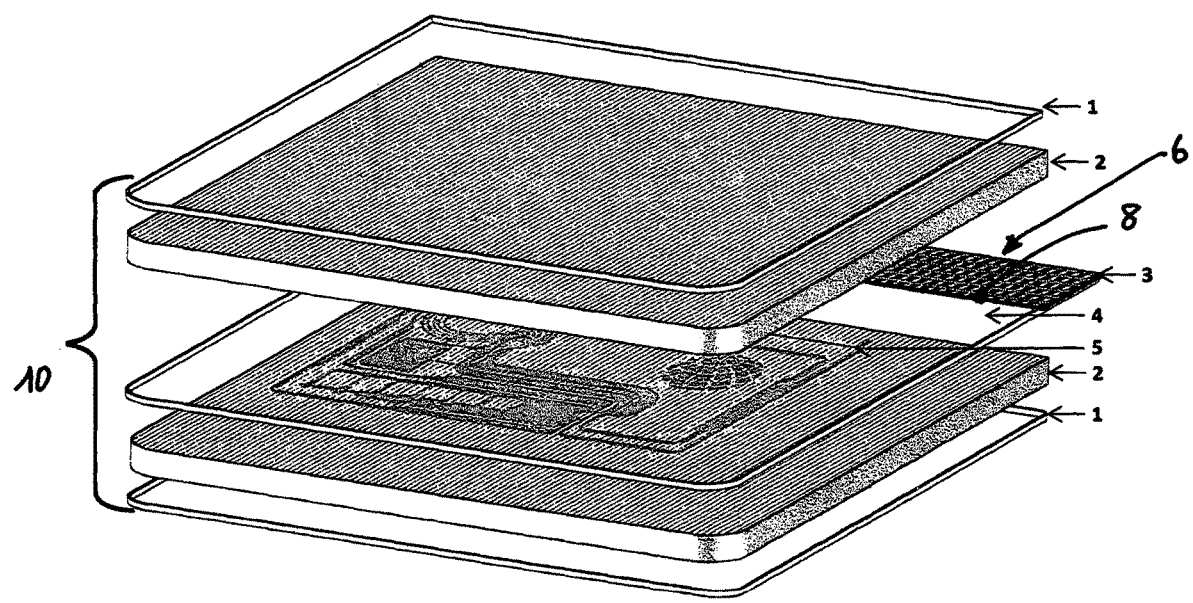
FIG. 2 shows an exploded perspective view of the insert of FIG. 1.

As is able to be seen in FIG. 2, it is highly advantageous for the metal layer 3 that is used to form the extension 6 to be the same metal layer as the one that is used to manufacture the antenna 5 (in the case of an electronic data page).

In other words, the metal layer(s) 3 that are used to manufacture the antenna, in particular by removal of material, are extended beyond the folding zone 8 of the hinge where the data page will be sewn into the passport booklet. This enables both very easy manufacture of the insert and increased resistance, making it possible to use thinner layers of material than in known inserts.

The additional layers 1, 2 of the insert are known per se and will not be described in greater detail.

The fact that the extension 6 of the hinge of the insert includes one or more visible metal layers 3 makes it possible to produce visible security designs 7 there. Use will be made of designs without metal, possibly with double-sided registration, or designs embossed into the metal, microstructures produced by goffering, holograms, laser perforations, color markings, or any other security marking able to be produced on a metal layer.

The insert as shown in FIG. 2 is easy to integrate into a data page, by laminating the insert with one or more additional layers of material, as is known per se. This data page will then also easily be able to be sewn or stapled into a passport booklet, as is also known per se.

Advantages of the Invention

Ultimately, the invention proposes a novel design for an insert for a passport booklet data page, in a technological breakthrough in relation to known inserts. This insert is only a component of the data page made of polycarbonate, and it may be sold in this form or in completed form after assembly in a data page.

The insert that is obtained is distinguished by its ease of assembly, since no additional material is applied to produce the hinge and the extension 6 beyond the folding and sewing zone. Specifically, the hinge and the extension 6 use the metal layer of the insert, in which layer the antenna of the insert is also produced in the case of an electronic insert.

The insert according to the invention is also distinguished by its much higher mechanical resistance to both tearing and pull-out, on account of the tight link between a metal layer and the layers made of plastic, in particular made of polyester, that surround it.

The manufacturing method is also very simple and economical. The laminating phase for creating a complete data page may be carried out in one or more laminating steps, either using a first step in order first of all to form an insert, or by laminating together all of the layers of the data page in a single laminating step, thus forming the final data page.

Lastly, the presence of an extension of the hinge made of metal makes it possible both to perform the sewing through the metal, the latter being a guarantee of mechanical resistance, and to have a zone in which various visible security designs are able to be produced: etchings, cutouts, holograms, watermarks, etc.

When the extension of the metal layer extends over the whole of the surface area of the data page, the metal layer is then able to form a shield, preventing data from being read from the data page when the passport booklet is closed.

The invention claimed is:

1. An insert for a passport booklet data page, formed by a multilayer complex including a pair of outer layers and an inner layer disposed between said pair of outer layers and including a hinge having a folding zone where the insert is intended to be sewn or stapled into a passport booklet, said inner layer including a combination of at least one layer made of plastic and at least one metal reinforcing layer together forming an extension that extends a certain distance beyond said folding zone of the hinge so as to improve the pull-out and tear resistance of said data page in relation to the passport booklet, wherein said layer made of plastic extends to the outer perimeter of the entire surface area of the insert, wherein said layer made of plastic and said metal reinforcing layer extend beyond side edges of the pair of outer layers, and wherein said metal reinforcing layer has a thickness of between 10 and 30 micrometers.

2. The insert as claimed in claim 1, further including an antenna enabling the insert to communicate with a remote reader.

3. The insert as claimed in claim 1, wherein said distance by which said extension extends beyond said folding zone is between 2 and 15 mm.

4. The insert as claimed claim 1, wherein said layer of plastic has a thickness of between 20 and 150 micrometers.

5. The insert as claimed in claim 1, wherein said layer made of plastic is made of polyester, and said metal reinforcing layer is made of aluminum.

6. The insert as claimed in claim 5, wherein the layer of aluminum is bonded to the layer of polyester using an adhesive having a thickness of 2 to 3 micrometers.

7. The insert as claimed in claim 1, further including, along the folding zone of the hinge, perforations, enabling the insert to be locally made more flexible.

8. The insert as claimed in claim 1, wherein said extension of the metal reinforcing layer includes one or more visible security elements that improve the resistance of the data page against forgery.

9. The insert as claimed in claim 8, wherein said security elements include visible designs etched into the metal reinforcing layer.

10. The insert as claimed in claim 8, wherein said security elements include designs that are visible by reflection, or designs in watermark form, holograms, laser-etched designs, or designs obtained by hot stamping, by goffering, by cutting or by embossing of the metal reinforcing layer.

11. A data page for a passport booklet, comprising an insert as claimed in claim 1.

12. A passport booklet, comprising a data page as claimed in claim 11.

* * * * *